United States Patent
Miller et al.

(10) Patent No.: US 12,047,255 B2
(45) Date of Patent: Jul. 23, 2024

(54) HYBRID ADAPTIVE NETWORKS

(71) Applicant: VIASAT, INC., Carlsbad, CA (US)

(72) Inventors: Craig A Miller, Carlsbad, CA (US); Meredith L Caligiuri, San Diego, CA (US); Richard A Vandermeulen, Dove Canyon, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 17/329,641

(22) Filed: May 25, 2021

(65) Prior Publication Data
US 2021/0281493 A1 Sep. 9, 2021

Related U.S. Application Data

(63) Continuation of application No. PCT/US2019/063438, filed on Nov. 26, 2019.

(51) Int. Cl.
*H04L 41/5009* (2022.01)
*H04L 41/147* (2022.01)
(Continued)

(52) U.S. Cl.
CPC ........ *H04L 41/5012* (2013.01); *H04L 41/147* (2013.01); *H04L 41/5006* (2013.01); *H04L 69/08* (2013.01)

(58) Field of Classification Search
CPC ............... H04L 41/5012; H04L 41/147; H04L 41/5006; H04L 69/08
See application file for complete search history.

(56) References Cited

U.S. PATENT DOCUMENTS 6,741,853 B1 * 5/2004 Jiang .................. H04M 3/4938
455/445
7,010,603 B2 3/2006 Martin, Jr. et al.
(Continued)

FOREIGN PATENT DOCUMENTS

CN 105491611 B 4/2016
WO 2011149533 A1 12/2011
(Continued)

OTHER PUBLICATIONS

3rd Generation Partnership Project; Technical Specification, "3GPP TS 24.312," V12.11.0 (Dec. 2015), Dec. 2015, 377 pgs.
(Continued)

*Primary Examiner* — Philip C Lee
(74) *Attorney, Agent, or Firm* — Chang & Hale LLP

(57) ABSTRACT

Described herein are hybrid adaptive networks (HAN) that enable the use of multiple, independent communications networks as a unified communications system. The disclosed HAN includes multiple communications networks that user terminals can simultaneously access. The disclosed HAN enables a user terminal to seamlessly roam across multiple communications networks. The disclosed HAN can increase the capabilities and resilience of user terminals by providing simultaneous access to multiple communications networks. For example, these communications networks may span multiple orbital regions, operate over multiple frequency bands, provide independent terrestrial infrastructure, and/or feature different network management and cyber defense implementations thereby providing inherent diversity and removing single points of failure and/or targets for attack.

13 Claims, 10 Drawing Sheets

(51) Int. Cl.
  *H04L 41/5006* (2022.01)
  *H04L 69/08* (2022.01)

(56) References Cited

U.S. PATENT DOCUMENTS

| | | | |
|---|---|---|---|
| 7,136,631 B1* | 11/2006 | Jiang | H04M 3/4938 |
| | | | 455/406 |
| 7,433,929 B2 | 10/2008 | Guilford et al. | |
| 7,676,559 B2 | 3/2010 | Cuervo | |
| 7,962,632 B2 | 6/2011 | Lipsanen | |
| 8,346,225 B2 | 1/2013 | Raleigh | |
| 8,493,935 B2 | 7/2013 | Zisimopoulos | |
| 8,516,552 B2 | 8/2013 | Raleigh | |
| 8,971,183 B1 | 3/2015 | Gupta | |
| 9,001,682 B2 | 4/2015 | Kovvali et al. | |
| 9,042,370 B2 | 5/2015 | Morrill et al. | |
| 9,077,630 B2 | 7/2015 | Backholm et al. | |
| 9,094,889 B2 | 7/2015 | Balasygun | |
| 9,203,714 B2 | 12/2015 | Smith et al. | |
| 9,380,494 B2 | 6/2016 | Sirotkin et al. | |
| 9,430,938 B2 | 8/2016 | Proud | |
| 9,439,060 B2 | 9/2016 | Liu et al. | |
| 9,560,585 B2 | 1/2017 | Forssell | |
| 9,591,556 B2 | 3/2017 | Ventimiglia et al. | |
| 9,819,565 B2 | 11/2017 | Djukic et al. | |
| 10,051,533 B2 | 8/2018 | Fitzpatrick | |
| 10,448,226 B1* | 10/2019 | Scott | H04W 48/18 |
| 10,917,840 B2* | 2/2021 | Boss | H04W 48/18 |
| 2003/0190029 A1 | 10/2003 | Marcus | |
| 2005/0197867 A1* | 9/2005 | Edgett | G06Q 10/02 |
| | | | 705/5 |
| 2005/0250496 A1* | 11/2005 | Hason | H04L 12/5692 |
| | | | 455/432.1 |
| 2007/0097959 A1 | 5/2007 | Taylor | |
| 2007/0121505 A1* | 5/2007 | Ansari | H04L 47/2408 |
| | | | 370/230 |
| 2007/0155399 A1* | 7/2007 | Alberth, Jr. | H04W 64/00 |
| | | | 455/456.1 |
| 2007/0285320 A1* | 12/2007 | Hayes | H01Q 21/28 |
| | | | 343/702 |
| 2008/0031277 A1* | 2/2008 | Walter | H04L 43/10 |
| | | | 370/469 |
| 2008/0227484 A1 | 9/2008 | Auvray et al. | |
| 2009/0082019 A1 | 3/2009 | Marsico | |
| 2010/0110890 A1 | 5/2010 | Rainer et al. | |
| 2011/0072506 A1 | 3/2011 | Law et al. | |
| 2011/0137818 A1* | 6/2011 | Goad | G06Q 30/0613 |
| | | | 705/347 |
| 2012/0058742 A1* | 3/2012 | Razoumov | H04L 41/5058 |
| | | | 455/406 |
| 2013/0035060 A1* | 2/2013 | Chan | H04M 15/805 |
| | | | 455/406 |
| 2013/0219039 A1 | 8/2013 | Ricci | |
| 2014/0066059 A1 | 3/2014 | Patil et al. | |
| 2014/0071854 A1 | 3/2014 | Xiang et al. | |
| 2014/0146754 A1* | 5/2014 | Bayesteh | H04W 72/21 |
| | | | 370/329 |
| 2015/0195858 A1 | 7/2015 | Jin et al. | |
| 2016/0323811 A1* | 11/2016 | Lepp | H04W 48/12 |
| 2017/0118091 A1 | 4/2017 | Townend et al. | |
| 2017/0146754 A1 | 5/2017 | Barwicz et al. | |
| 2017/0171231 A1 | 6/2017 | Reybok, Jr. et al. | |
| 2017/0243268 A1* | 8/2017 | Fukuda | G06Q 30/0611 |
| 2017/0279715 A1 | 9/2017 | Li | |
| 2018/0116000 A1* | 4/2018 | Ly | H04W 74/0833 |
| 2021/0281493 A1* | 9/2021 | Miller | H04L 69/08 |

FOREIGN PATENT DOCUMENTS

| | | |
|---|---|---|
| WO | 2013134669 A1 | 9/2013 |
| WO | 2014082603 A1 | 6/2014 |
| WO | 2015074991 A1 | 5/2015 |
| WO | 2016024809 A1 | 2/2016 |
| WO | 2017200978 A1 | 11/2017 |
| WO | 2018008980 A1 | 1/2018 |
| WO | 2018017840 A1 | 1/2018 |
| WO | 2018093168 A1 | 5/2018 |
| WO | 201811973 A1 | 6/2018 |

OTHER PUBLICATIONS

Carnegie Technologies, "Connection Management," 2018, 6 pgs.
Philippe Chiron et al., "Architectures for IP-Based Network-Assisted Mobility Management Across Heterogeneous Networks," IEEE Wireless Communications, 1536-1284/08, Apr. 2018, pp. 18-25.
Ken A Peterman, "Hybrid Adaptive Networks is the Quickest, Best Way to Harness Advance Technologies and Deploy New Military Satellite Capabilities," Apr. 8, 2018, 9 pgs.
Stefano Salsano et al., "SIP-Based Mobility Management in Next Generation Networks," IEEE Wireless Communications, 1536-1284/08, Apr. 2008, pp. 92-99.
International Search Report and Written Opinion, PCT/US2019/063438, Feb. 19, 2020, 10 pgs.

* cited by examiner

HYBRID ADAPTIVE NETWORKS

CROSS-REFERENCE TO RELATED APPLICATIONS

This application is a national stage entry of International (PCT) App'n No. PCT/US2019/063438 filed Nov. 26, 2019 and entitled "HYBRID ADAPTIVE NETWORKS," which claims priority to U.S. Prov. App'n No. 62/822,666 filed Mar. 22, 2019 and entitled "HYBRID ADAPTIVE NETWORK," and to U.S. Prov. App'n No. 62/772,402 filed Nov. 28, 2018 and entitled "HYBRID ADAPTIVE NETWORK," each of which is expressly incorporated by reference herein in its entirety for all purposes.

BACKGROUND

Field

The present disclosure relates to managing and to selecting network connections between user terminals and communications networks with differing network characteristics.

Description of Related Art

Network connectivity between a user terminal and a destination network, such as the Internet, can be provided using communications or transport networks. Communications networks can use different infrastructure (e.g., satellite networks, terrestrial networks, etc.), communication means (e.g., wireless, cabled, etc.), communication protocols, and the like. A user terminal can be configured to connect to a communications network to allow two-way communication between the destination network, or a device at a target address on the destination network, and the user terminal.

SUMMARY

In a first aspect, a hybrid adaptive network (HAN) manager is disclosed that is configured to manage and to select network connections between user terminals and communications networks. The HAN manager includes a network interface configured to receive network communication from the user terminals and the communications networks. The HAN manager also includes a data store comprising computer executable instructions. The HAN manager also includes one or more processors configured to execute the computer executable instructions stored on the data store. The computer executable instructions are configured to cause the HAN manager to receive a user request from a user terminal, the user request including connection criteria; send to compatible communications networks a service request based on the user request; receive, in response to the service request, a bid response from individual compatible communications networks; determine a score for individual compatible communications networks, the score based at least in part on parameters included in the received bid response; and send a service selection to the user terminal, the service selection including the communications network with the highest score.

In some embodiments of the first aspect, the service selection further includes an ordered list of compatible communications networks, the ordered list based on the scores determined for each of the compatible communications networks. In some embodiments of the first aspect, the network interface further includes an open standard network interface that is configured to send control commands to the communications networks. In some embodiments of the first aspect, the network interface further includes an open standard network interface that is configured to receive network status information from the communications networks. In some embodiments of the first aspect, the communications networks include two or more communications networks that operate over different frequency ranges. In some embodiments of the first aspect, the communications networks include two or more communications networks that operate using different network protocols. In some embodiments of the first aspect, the communications networks include two or more communications networks that operate using different waveforms. In some embodiments of the first aspect, the user request includes a minimum data rate. In some embodiments of the first aspect, the score depends at least in part on previous bid compliance. In some embodiments of the first aspect, the bid responses each include a service delivery probability.

In some embodiments, a hybrid adaptive network includes the HAN manager of the first aspect and one or more of the communications networks. In some embodiments, a hybrid adaptive network includes the HAN manager of the first aspect and one or more of the user terminals.

In a second aspect, a method is provided for managing a hybrid adaptive network. The method includes receiving a user request from a user terminal; announcing a service request to a plurality of communications networks, the service request based on the received user request; receiving service bids from the plurality of communications networks responsive to the announced service request; determining a winning communications network based on analysis of the received service bids; and assigning service for the user terminal to the winning communications network.

In some embodiments of the second aspect, analysis of the received service bids includes determining a score for each of the plurality of communications networks. In further embodiments, the method further includes sending a fulfillment list of the plurality of communications networks to the user terminal, the fulfillment list including an ordered list of the plurality of communications networks based on the determined scores for each of the plurality of communications networks.

In some embodiments of the second aspect, the method further includes receiving network performance information from the winning communications network. In further embodiments, the method further includes determining an updated winning communications network in response to the network performance information indicating a degradation in performance of the winning communications network.

In some embodiments of the second aspect, assigning service includes providing credentials to enable connectivity between the user terminal, the winning communications network, and a destination network. In some embodiments of the second aspect, the service request includes a destination network.

In a third aspect, a method is provided for managing a hybrid adaptive network. The method includes determining scores for each of a plurality of compatible communications networks, the scores based on network performance parameters; transmitting the determined scores to one or more user terminals; receiving information affecting the network performance parameters; and in response to the received information indicating a degradation in the network performance parameters for one or more affected compatible communications networks, updating the scores for the one or more affected compatible communications networks.

In some embodiments of the third aspect, the received information includes weather information. In some embodiments of the third aspect, the received information includes threats to at least one of the plurality of compatible communications networks. In some embodiments of the third aspect, the method further includes sending the updated scores to the one or more user terminals. In some embodiments of the third aspect, the degradation in network performance is predicted to occur at a later time.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION OF SOME EMBODIMENTS

Figure 1:
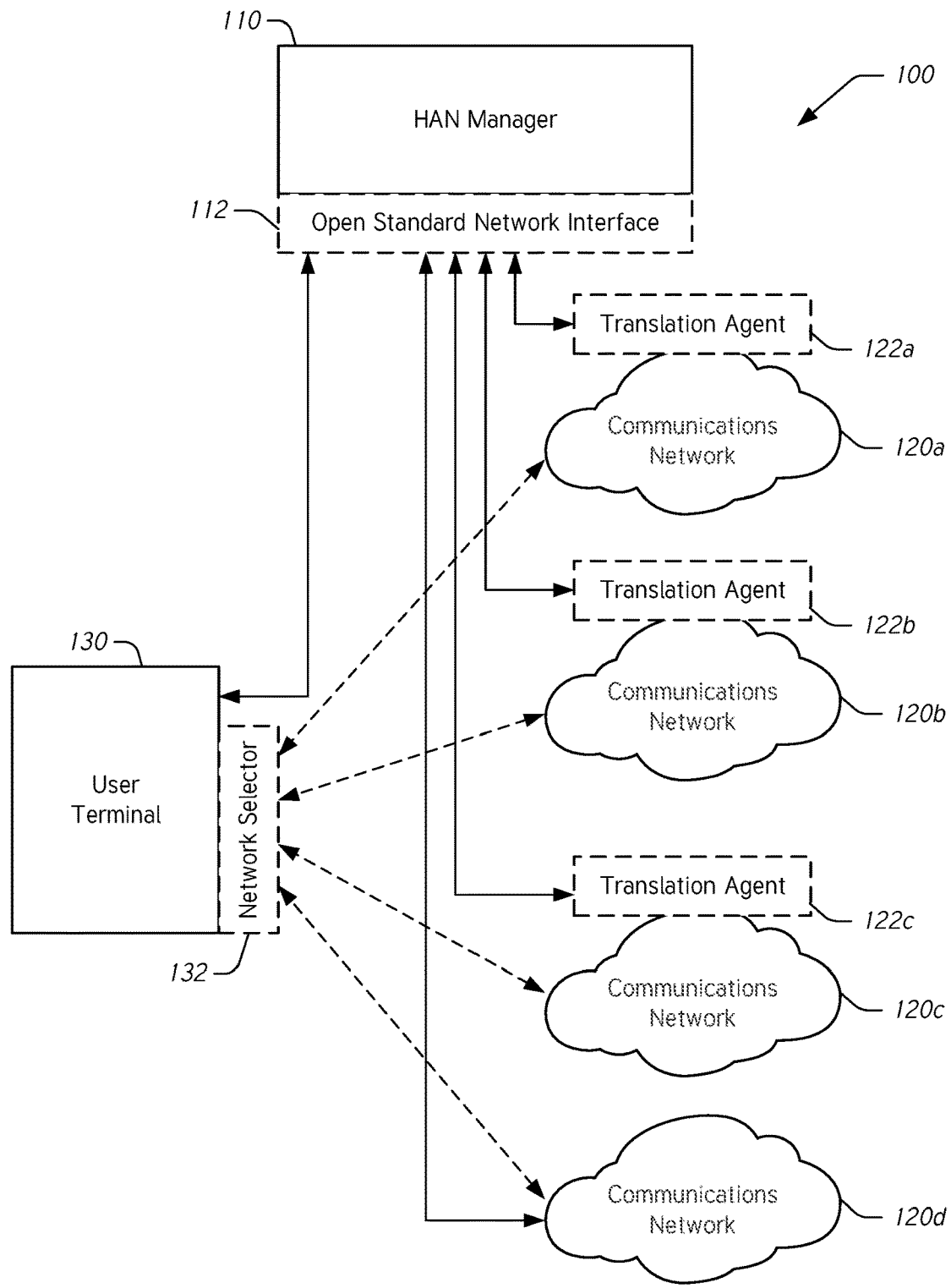
FIG. 1 illustrates a block diagram of a hybrid adaptive network (HAN) that includes a HAN controller or manager, a plurality of transport or communications networks, and a multi-mode user terminal.

The headings provided herein, if any, are for convenience only and do not necessarily affect the scope or meaning of the claimed invention.

Overview

A user connects to a destination network, such as the Internet, using a communications network that provides network communication between a user terminal and a targeted network address. The communications network may also be referred to as a component network or a transport network. The role of the communications network is to provide connectivity between a user terminal and a target or destination network. The communications network can be a satellite network, a terrestrial network, or a terrestrial wireless, the communications network can be a commercial communications network, a purpose-build government communications network, or a combination of both.

This network communication configuration suffers from a number of weaknesses. For example, communication failures result when the communications network goes down. As another example, network communication in this configuration has a single point of failure, the communications network. Thus, there is a need for a robust and seamless way to re-establish or switch communications networks in case of failure or performance degradation.

Accordingly, to address these and other related issues, described herein are example embodiments of hybrid adaptive network (HAN) configurations that enable the use of multiple, independent communications networks as a unified communications system. The disclosed HAN includes multiple communications networks that user terminals can simultaneously access. The disclosed HAN enables a user terminal to seamlessly roam across multiple communications networks. The disclosed HAN can increase the capabilities and resilience of user terminals by providing simultaneous access to multiple communications networks. For example, these communications networks may span multiple orbital regions, operate over multiple frequency bands, provide independent terrestrial infrastructure, and/or feature different network management and cyber defense implementations thereby providing inherent diversity and removing single points of failure and/or targets for attack.

Connectivity between user terminals and available communications networks is managed by a HAN manager. The HAN manager can be configured to manage connections between a plurality of user terminals across a plurality of different kinds of communications networks. The HAN manager provides "communications-as-a-service" similar to other on-demand services provided to users such as software-as-a-service (SaaS), platform-as-a-service (PaaS), infrastructure-as-a-service (IaaS), etc. The HAN manager can similarly be described as providing on-demand "Network-as-a-service (NaaS)." The HAN manager can be a service that brokers on-demand access to multiple available communications networks each with different characteristics. The HAN manager may be a cloud-based service but it is not limited to implementation in a cloud environment.

The HAN manager is configured to manage and to select connections to a plurality of communications networks. The HAN manager can select a winning communications network, or an ordered list of winning communications network, for a user terminal based at least in part on user requirements, capabilities of the user terminal (e.g., compatibility with communications networks), knowledge of potential threats or outages to networks, network parameters, capabilities of a communications network to respond to or mitigate an attack, or the like. The HAN manager may use various methods to determine a winning communications network. These methods can include, for example and without limitation, analyzing user requirements, assessing network capabilities, considering external conditions that may affect network communication, assessing threats to communications networks, or any combination of these or the like.

As an example, the HAN manager may implement a bidding process as the method for determining the winning communications network. The bidding process analyzes user requirements or connectivity preferences and communications networks characteristics to determine a preferred or winning communications network to connect to a requesting user terminal. For example, the HAN manager can receive a user request from a user terminal that includes communications requirements, forward a service request based on the user request to a plurality of communications networks, receive bids from those communications networks related to fulfilment of the user's requirements, and connect the user terminal to the winning communications network based at least in part on scoring the bids relative to the user's requirements. Thus, the HAN manager selects one communications network over other available communications networks for a particular user based at least in part on user requirements, network parameters, and/or network capabilities.

The disclosed systems, devices, and methods provide several advantages that result in more robust and seamless network connectivity. For example, the disclosed HAN allows the use of multiple, independent communications networks as a single or unified communications system. Additionally, the disclosed HAN enables user terminals to seamlessly roam across multiple communications networks. As another example, the disclosed HAN also removes single points of failure to bolster network communication. The disclosed HAN also provides diversity in network communication, strengthening network communication against potential attacks and failures. As another example, the disclosed HAN provides robust, scalable communications networks built on open standards. Furthermore, the disclosed HAN is able to quickly overcome network outages or performance degradation to maintain connectivity even in contested domains. The disclosed HAN can also easily improve and incrementally upgrade existing network assets. The disclosed HAN also facilitates adapting to emerging and/or expanding network communication technologies.

Other advantages of the disclosed systems, devices, and methods include the ability of a user (or user terminal) to specify criteria for network connectivity. The HAN manager receives the specified criteria and identifies candidate communications networks for the user. In some embodiments, candidate communications networks are based at least in part on the user terminal capabilities (e.g., compatibility with communications networks). The HAN manager receives bids from candidate communications networks for analysis to determine superior or preferred communications networks for the user. The HAN manager automatically analyzes the bids from the candidate communications networks and assesses capabilities of the user terminal to determine a preferred and/or an ordered list of preferred candidate communications networks for the user. The user then connects to a communications network based on the preferred and/or ordered list of candidate communications networks from the HAN manager. In some embodiments, the HAN manager can continually, intermittently, or periodically update the preferred and/or ordered list of communications networks and send the list to the user. In certain implementations, this may occur without the user sending a new or updated request to the HAN manager.

Other advantages of the disclosed systems, devices, and methods include increasing the resiliency of a network against potential adversaries or attackers. Due at least in part to the spread of user terminals across multiple communications networks, it may be difficult for an attacker to target user terminal communications for data collection, exploitation, or denial. This multi-network resiliency provides deterrence to potential attackers. Furthermore, the ability to easily maneuver user terminals on the HAN system imposes increased time, effort, and cost for a potential attacker.

FIG. 1 illustrates a block diagram of a HAN 100 that includes a HAN controller or manager 110, a plurality of transport or communications networks 120a-120d, and a multi-mode user terminal 130. The HAN 100 can provide a service delivery platform for users wherein users are matched or connected to communications networks that fulfill user criteria or requirements. The communications network to which a user is connected may change over time so that the user terminal may experience superior performance relative to a static connection to a single communications network. The HAN manager 110 can monitor demands of individual users and the resources available through the component networks 120a-120d and assign users to the communications network that efficiently or effectively meets their needs at a given time. User requirements or demands, such as the need to operate in a contested environment, or the need for low probability of intercept (LPI) and/or low probably of detection (LPD) operations, or network parameters, such as maximum data rate, rapid scalability, congestion, availability, and cost per bit, or geography can cause the HAN manager 110 to select one communications network (or a subset of communications networks) over other communications networks for a given user terminal. The nature of hybrid networking as embodied in the HAN 100 is such that the best or preferred communications network for a user terminal can change based on conditions, user needs or demands, individual use cases, geography, economics, and/or time.

The HAN 100 includes a user terminal 130 configured to establish a network connection with each of the plurality of communications networks 120a-120d, shown using dashed lines in the figure. In addition, the HAN manager 110 configured to communicate with each of the user terminal 130 and the plurality of communications networks 120a-120d, shown using solid lines in the figure. To enable connection to the plurality of communications networks 120a-120d, the user terminal 130 may include a network selector 132 that is compatible with a variety of different network protocols, waveforms, communication frequency bands, and the like. To enable communication between the communications networks and the HAN manager 110, an open standard network interface 112 may be implemented that is associated with the HAN manager 110. The open standard network interface 112 is configured to provide a standard means of communicating status information and providing control commands. The communications networks 120a-120c can each include a corresponding translation agent 122a-122c that acts to translate communication protocols native to the associated communications network to communication protocols compatible with the open standard network interface 112. In the example of FIG. 1, the communications network 120d is configured to be compatible with the open standard network interface 112 and thus does not include a translation agent.

The HAN manager 110 or HAN controller is configured to maintain a list of the plurality of communications networks 120a-120d including each communications network's capabilities. The HAN manager 110 is configured to select a winning communications network from the plurality of communications networks 120a-120d for the user terminal 130. The HAN manager 110 may use various methods to determine a winning communications network for the user terminal 130 which may include, for example and without limitation, analysis of user requirements, analysis of network capabilities, analysis of external conditions that may affect network communication, analysis of threats to communications networks, analysis of capabilities and techniques for responding to and mitigating attacks, and the like.

As a particular example, the HAN manager 110 can be configured to implement a bidding process to determine a winning communications network for the user terminal 130. The bidding process involves the HAN manager 110 receiving information from both the user terminal and one or more of the communications networks 120a-120d and determining a preferred or winning communications network based at least in part on analysis of the received information. For example, the HAN manager 110 is configured to receive requests from the user terminal 130 to connect to a destination network through an available communications network where the user request includes user requirements for the connection. In response, the HAN manager 110 is configured to identify available communications networks that meet the received requirements. The HAN manager 110 can then solicit bids from those communications networks. The HAN manager 110 may also be configured to receive bids from those communications networks and to evaluate the received bids to determine a preferred communications network or a fulfillment list of preferred communications networks. The preferred communications network is determined based on scoring the received bids in view of the user requirements and/or in view of information about the communications networks stored on the HAN manager 110. The fulfillment list includes an ordered list of communications networks where the order is based on a scoring system resulting from analysis of the received bids. The HAN manager 110 is also configured to establish a connection between the user terminal 130 and the winning communications network. The HAN manager 110 is configured to monitor the status of the communications networks 120a-120d.

In some embodiments, the HAN manager 110 is configured to repeat the bidding process or at least evaluate whether another bidding process would be beneficial when network conditions change, user terminal conditions change, and/or the geography of the user terminal in relation to the communications networks changes. By way of example, changes that may initiate another bidding process may include, but are not limited to, changes in security level, changes in network vulnerabilities, changes in performance of the communications network, changes in the requirements of the user, changes in the coverage of a communications network relative to the user terminal (e.g., moving out of a spot beam of a satellite network), or the like. In certain implementations, the bidding process can be re-initiated without a request from the user terminal 130 and/or without receiving updated user requirements from the user terminal 130.

In some embodiments, the HAN manager 110 updates the fulfillment list and/or the winning communications network without initiating another bidding process. In such embodiments, the HAN manager 110 can be configured to re-analyze the scoring of the communications networks based on performance parameters of the communications networks. Based on an update of the scoring analysis, a new preferred communications network or an updated fulfillment list can be sent to the user terminal 130. The HAN manager 110 can then proceed to connect the user terminal 130 to the new winning or preferred communications network.

The HAN manager 110 can also be configured to provide credentials to a destination network that allows the user terminal and the destination network each to connect to the winning communications network. In some embodiments, the HAN manager 110 is also configured to set the network selector 132 of the user terminal 130 and/or the destination network to route traffic over the winning communications network.

The HAN manager 110 is configured to monitor the demands of individual users, to monitor the availability of resources through the communications networks 120a-120d, and to assign the user terminal 130 to the communications network that most efficiently meets their needs at any given time. The HAN manager 110 is configured to select one communications network over others for a given user terminal based at least in part on mission parameters (e.g., the need to operate in a contested environment or the need for particular operations), knowledge of potential threats or outages to the network (e.g., weather or purposeful threat to a network that could create an outage or degraded performance), network parameters (e.g., maximum data rate, network congestion, availability, cost per bit, etc.), network capabilities and in-network techniques to respond to and to mitigate attacks, or the like. The nature of hybrid adaptive networking is such that a preferred or best network may change based on user demands, geography, economics, time, network performance, threats to the network, or the like.

The HAN manager 110 is configured to provide control and detailed situational awareness to individual user terminals for a variety of populations with millions of users, for example. The HAN manager 110 can also provide a detailed common operational picture and the ability to manage individual users, regardless of which communications network they are currently using.

The HAN manager 110 can be implemented using one or more processors and memory on a general-purpose computer or across a distributed computing environment. The functionality and components of the HAN manager 110 may be implemented using hardware, software, firmware, or any combination thereof.

The HAN manager 110 may have an associated open standard network interface 112. To participate in the HAN 100, individual communications networks provide a means of receiving commands from and providing status to the HAN manager 110. The open standard network interface 112 specifies the type and structure of the information that can be exchanged between the HAN manager 110 and the communications networks 120a-120d within the HAN 100. Thus, a communications network 120a-120d can be configured to natively communicate with the HAN manager 110 through the open standard network interface 112 (such as communications network 120d) or it can be configured to include a translation agent that translates status and commands between the open standard network interface 112 and the corresponding communications network (such as the communications networks 120a-120c with corresponding translation agents 122a-122c).

The open standard network interface 112 allows the HAN manager 110 to control multiple communications networks 120a-120d with a single set or a few sets of commands, allowing new communications networks to be added to the HAN 100 without changes to the HAN manager 110. With a simple, scalable interface at the network or control layer (such as an XML schema or similar framework), communications networks that wish to participate in the HAN 100 can construct a translation agent or can be constructed to be compatible with the open standard network interface 112. A translation agent is a software layer that translates the communications network's native control and status facilities into the format compatible with the open standard network interface 112. Software translation agents can be created quickly and inexpensively without changes to proprietary networks or their management systems. However, if a networks management system is already compatible with the open standard network interface 112, a translation agent is not necessary.

The open standard network interface 112 specifies the type and/or the structure of information exchanged between the HAN manager 110 and the component networks 120a-120d within the HAN 100. The open standard network interface 112 allows the HAN manager 110 to control multiple different component networks with one or a few sets of commands. The open standard network interface 112 allows new networks to be added to the HAN 100 without changes to the HAN manager 110. The open standard network interface 112 manages connections between user terminals and available communications networks. In some embodiments, however, the HAN manager 110 does not have an associated open standard network interface.

The plurality of communications networks 120a-120d or transport networks can be any suitable network that connects the user terminal 130 to a destination network such as the Internet, a private network (such as the Department of Defense Information Network or DoDIN), an internal network of an entity, or the like. A communications network can be provided by a satellite, a constellation of satellites, terrestrial networks, terrestrial wireless networks, or any combination of these. The communications networks 120a-120d can operate using different network protocols, waveforms, frequency bands, or the like. The communications networks 120a-120d can be independent from each other such as where each communications network is managed or owned by a different entity. The communications networks 120a-120d can be commercial, government purpose-build, or a combination of both. Examples of communications networks 120a-120d include, for example and without limitation, COMSAT, MILSAT, Wideband Global SATCOM (WGS), VIASAT®, terrestrial networks, terrestrial wireless networks, and/or other commercial networks. In some embodiments, individual communications networks 120a-120d can include a network controller (not shown) with which the HAN manager 110 communicates.

Individual communications networks 120a-120c include corresponding translation agents 122a-122c that enable the communications network to communicate with the HAN manager 110 through the open standard network interface 112. An individual translation agent 122a-122c can be a software layer that translates a network's native control and status facilities into a format compatible with the open standard network interface 112. As such, a translation agent for a communications network can be created relatively quickly and inexpensively without changes to proprietary networks or their management systems. For certain communications networks, such as communications network 120d, no translation agent may be needed because the network controller or manager of the communications network 120d is natively compatible with the open standard network interface 112.

The communications networks 120a-120d are configured to intermittently send status information to the HAN manager 110 through their corresponding translation agent, if necessary, and through the open standard network interface 112, if included. The status information includes data associated with network performance parameters and may include, for example and without limitation, data rate, interference environment, service delivery probability, price, outages, disruptions, service impacting events, threat details, coverage area, congestion or network loading, overall network and user health information, or the like.

In some embodiments, the HAN 100 does not impose compatibility requirements for individual communications networks. For example, there may be no waveform or over-the-air protocol specification, and no internal management or routing requirements. Individual communications network providers can be free to architect their networks as they see fit. This approach can increase or maximize the number of communications networks that are compatible with the HAN 100. A large pool of communications networks may be made available to the HAN 100 and new networks can be added as the new networks come on line. This can allow users to benefit from ongoing market-based competition among network providers, which can increase or maximize capability and resilience and reduce or minimize cost.

The user terminal 130 is a multi-mode user terminal that is configured to operate over multiple frequency bands (e.g., C, X, Ku, Ka, UHF, Mil-Ka, etc.) and to support multiple network protocols and waveforms (e.g., VIASAT®, Enhanced Bandwidth Efficient Modem (EBEM), protected tactical waveform (PTW), digital video broadcasting—second generation (DVB-S2), terrestrial and terrestrial wireless, etc.). The multi-mode user terminal 130 is thus configured to operate using different communications networks that offer different capabilities in efficiency, performance, resiliency, and the like. Moreover, the multi-mode user terminal 130 is configured to use communications networks 120a-120d in their native format, enabling the use of a particular communications network's entire protocol suite. The user terminal 130 is configured to quickly switch from one operating band and/or protocol to another. In some embodiments, the user terminal 130 is configured to automatically switch between operating bands and/or protocols without human intervention. Thus, the user terminal 130 can provide seamless access to the communications networks 120a-120d of the HAN 100.

The user terminal 130 can be configured to switch between communications networks if the communications network to which it is connected goes down or suffers performance degradation. In such instances, the user terminal 130 can be configured to automatically switch to the next communications network on the fulfillment list or it can receive a new winning network from the HAN manager 110 and switch to that communications network. In some embodiments, the user terminal 130 is configured to intermittently receive an updated fulfillment list or an updated winning communications network from the HAN manager 110 without initiating a bidding process through a user request.

The user terminal 130 can be customer provided equipment that includes these capabilities. The network selector 132 provides the ability to switch between the different communications networks 120a-120d with their corresponding differences in frequency bands, network protocols, waveforms, and the like. This makes the user terminal 130 flexible and interoperable. In some embodiments, a software-defined user terminal can be utilized. Software-defined terminals can switch between multiple different networks and retain interoperability, which can all be incremental upgrades to a terminal base. Subsets of user terminals can be upgraded while maintaining compatibility with existing terminals of the installed base. This can allow the population of user terminals to be upgraded in small units rather than upgrading all user terminals, which can avoid a massive overhaul of the installed base.

Example Hybrid Adaptive Networks

Figure 2A:
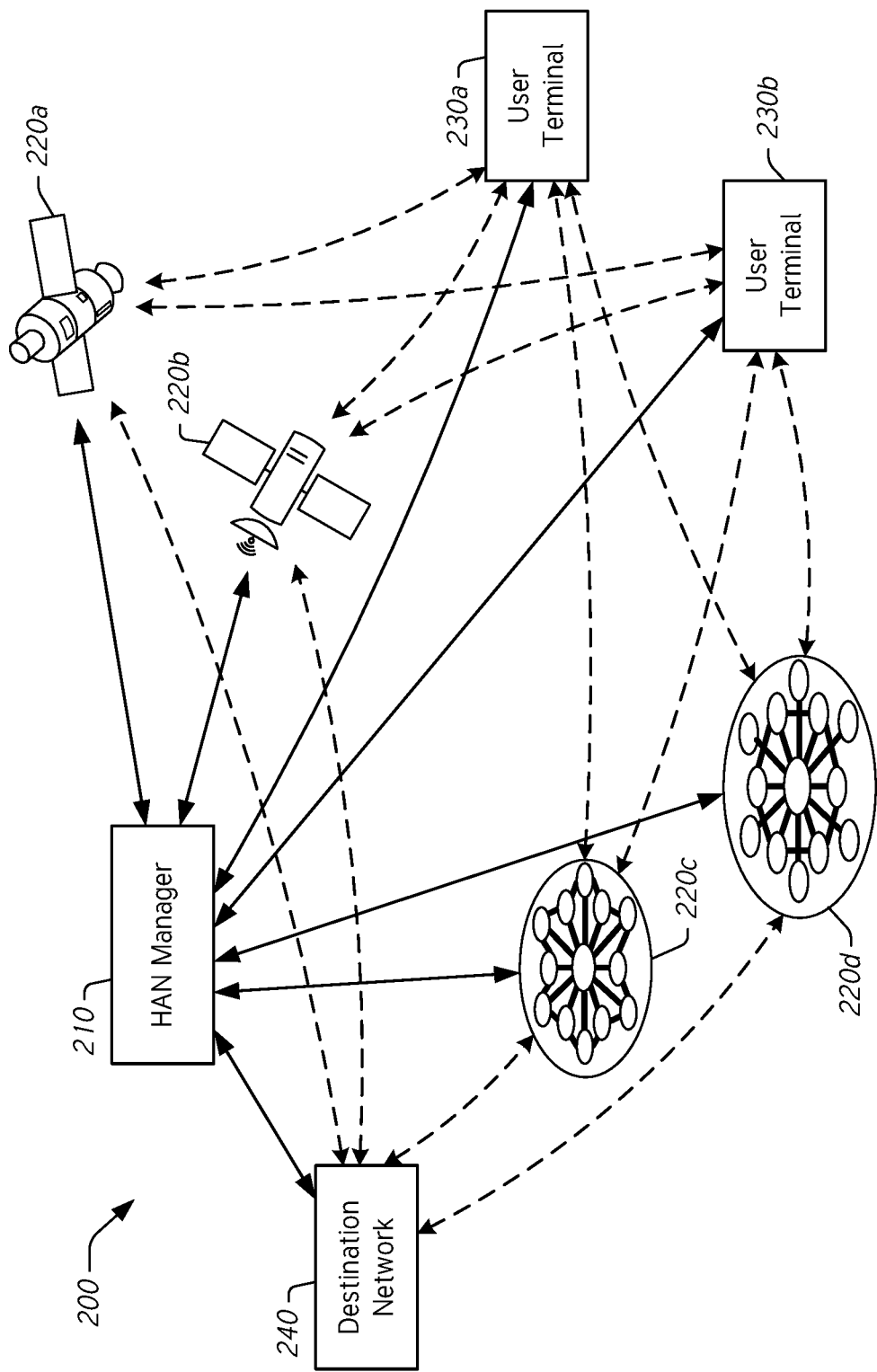
FIG. 2A illustrates a schematic diagram of an example HAN that includes a HAN manager, a plurality of user terminals, a plurality of transport networks, and a destination network.

FIG. 2A illustrates a schematic diagram of an example HAN 200 that includes a HAN manager 210, a plurality of user terminals 230a, 230b, a plurality of transport networks 220a-220d, and a destination network 240. The HAN manager 210 is similar to the HAN manager 110 described herein with reference to FIG. 1. Although not shown, the HAN manager 210 may interface with the transport networks 220a-220d using an open standard network interface, as described herein with reference to FIG. 1. The user terminals 230a, 230b are each similar to the multi-mode user terminal 130 described herein with reference to FIG. 1. Although not shown, the user terminals 230a, 230b each include a network selector that enables connectivity to the various transport networks 220a-220d. The transport networks 220a-220d share characteristics with the communications networks 120a-120d described herein with reference to FIG. 1. Although not shown, one or more of the transport networks 220a-220d may include a translation agent similar to the translation agents described herein with reference to FIG. 1. The transport networks 220a, 220b are illustrated as satellite networks and each of these transport networks may include one or more satellites to form the transport network. The transport networks 220c, 220d include terrestrial networks. However, it is to be understood that each of the transport networks 220a-220d may include satellite components, terrestrial components, or a combination of both.

The HAN manager 210 is configured to control elements of each of the transport networks 220a-220d, user terminals 230a, 230b, and the destination network 240, as shown by the solid lines in the figure. This allows the HAN manager 210 to send and to receive status information from the transport networks 220a-220d, to control connections between transport networks 220a-220d and user terminals 230a, 230b, and to control connections between transport networks 220a-220d and the destination network 240. By way of example, the HAN manager 210 can issue a command to the user terminals 230a, 230b that lists the preferred transport networks, includes fulfillment network prioritization (e.g., when to switch to a different transport network), directs selection of a particular transport network, and the like. As another example, the HAN manager 210 may issue a control command to a transport network 220a-220d that the network specify service requirements (e.g., performance or network effects). Although not shown, the transport networks 220a-220d include network controllers with which the HAN manager 210 communicates.

Network connectivity is illustrated using dashed lines between the transport networks 220a-220d and the user terminals 230a, 230b and the destination network 240. This shows that each user terminal 230a, 230b is capable of connecting to each transport network 220a-220d. Similarly, the destination network 240 is capable of connecting to each transport network 220a-220d. It should be understood that although a single destination network is illustrated, there can be multiple destination networks. Due at least in part to the multiple paths between and user terminals 230a, 230b and the HAN manager 210 through the transport networks 220a-220d, communication between the HAN manager 210 and a particular user terminal may be established even if a transport network goes down due to failure or attack. This allows the HAN manager 210 to update a preferred or winning transport network or a fulfillment list on a user terminal even where a transport network fails. This bolsters the resilience of the HAN 200 against network failures. Even where there is no network failure, a user terminal 230a, 230b can preemptively switch transport networks if the network status changes significantly. The significance of the change can be determined by a user terminal and/or by the HAN manager 210. Examples of changes that may prompt a switch to a new transport network include, for example and without limitation, link impairment information (e.g., low signal-to-noise ratio (SNR)), not achieving return or forward link data rates needed to support the user requirements, identification of a threat or outage that could cause a disruption or degraded service offering (e.g., network congestion), degradation of performance due to weather or other interference (intentional or non-intentional), increase in network congestion, movement of a user terminal into a different performance coverage area, or the like. The user terminal 230a, 230b can change transport networks by receiving an updated winning transport network from the HAN manager 210 or by moving to the next transport network on a previously received fulfillment list. In some embodiments, the user terminal 230a, 230b can automatically switch transport networks without human intervention.

The destination network 240 includes any suitable destination such as the Internet, private network (e.g., Department of Defense Information Network), access network, a terminal, a "meet me point," or other such destination. The HAN manager 210 does not need to know the path between the destination network 240 and the user terminal 230a, 230b as that is handled by components of the transport networks 220a-220d, the user terminal 230a, 230b, and/or the destination network 240.

Figure 2B:
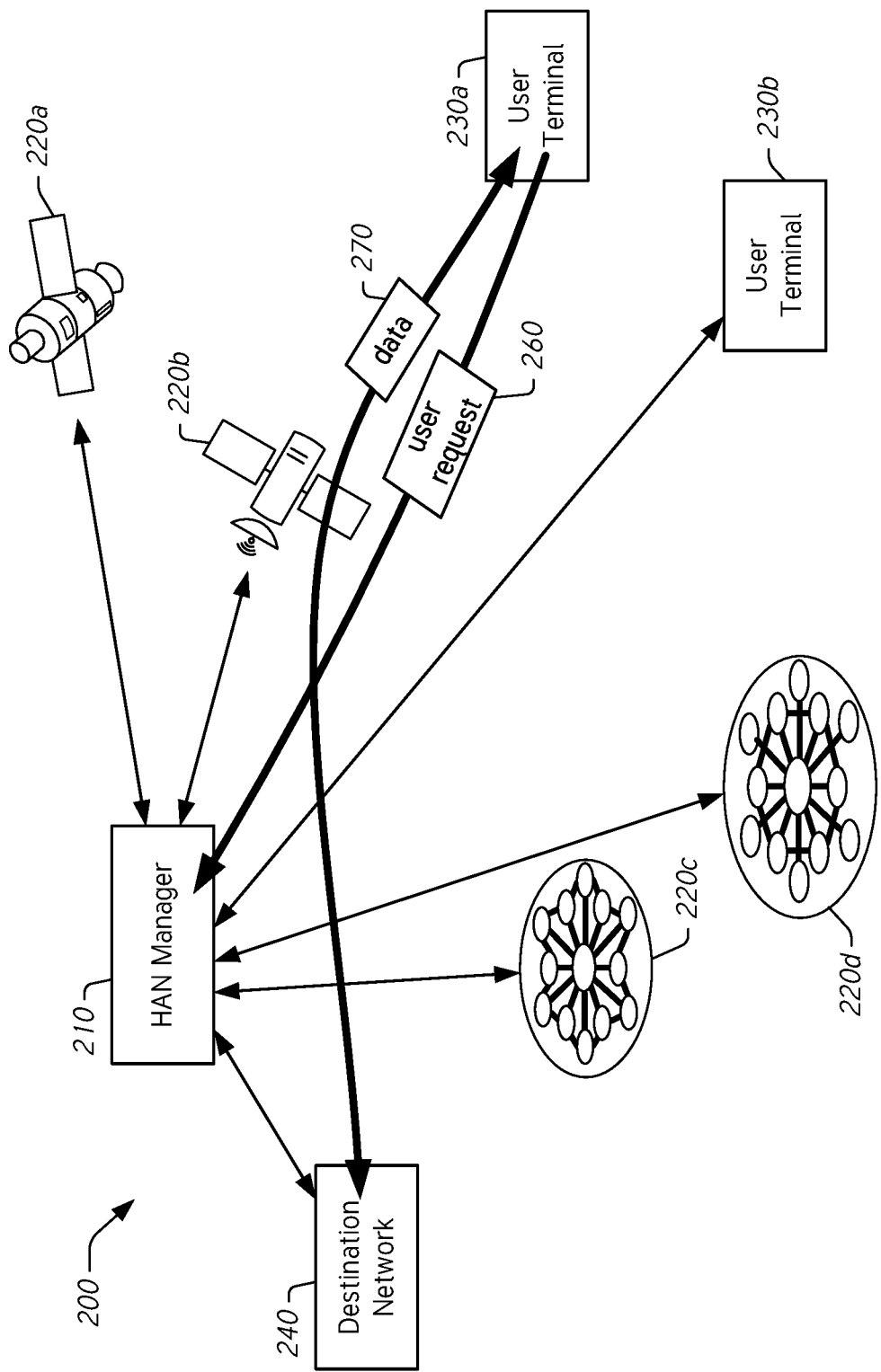
FIG. 2B illustrates the HAN of FIG. 2A where a user terminal is connected to the destination network through a winning transport network.

FIG. 2B illustrates an example of the user terminal 230a connecting to the destination network 240 through the transport network 220b. The user terminal 230a issues a request 260 to connect to the HAN manager 210, and the HAN manager 210 in turn determines a winning transport network and establishes a connection between the user terminal 230a, the transport network 220b, and the destination network 240. The request 260 may include user requirements and/or preferences. The HAN manager 210 identifies available and compatible transport networks that can meet the user requirements. After soliciting bids from the compatible transport networks, the HAN manager 210 determines which of the bids is preferential for the user terminal 230a. The HAN manager 210 provides credentials to the destination network 240 and to the user terminal 230a that allows each to connect to the winning transport network 220b. Establishing this connection may include setting the network selectors of the destination network 240 and the user terminal 230a to route data 270 over the winning transport network 220b. Thus, the user terminal 230a can send network data 270 to the destination network 240 using the transport network 220b. If, at a later time, a different transport network is determined to be the winning network, the route can be changed by the HAN manager 210 to go through that different winning transport network.

Figure 3:
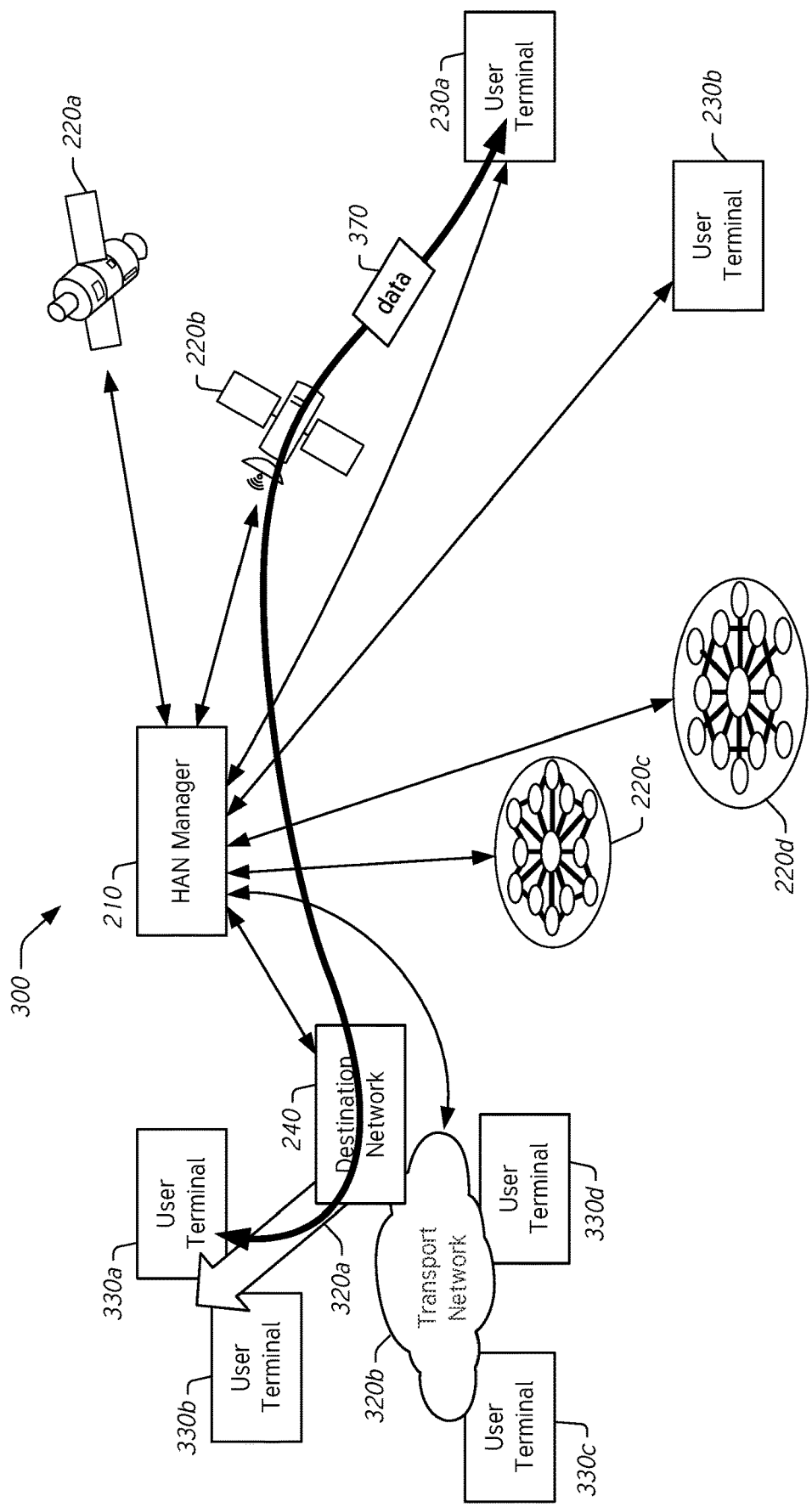
FIG. 3 illustrates another example HAN that includes additional user terminals and transport networks relative to the HAN of FIG. 2A.

FIG. 3 illustrates another example HAN 300 that includes additional user terminals 330a-330d and transport networks 320a, 320b relative to the HAN 200 of FIG. 2A. The user terminals 330a-330d may be similar to the user terminal 130 described herein with reference to FIG. 1. The transport network 320a is a fixed or mobile transport network that is not controlled by the HAN manager 210. The user terminals 330a, 330b are connected to the destination network 240 through the transport network 320a. The transport network 320*b* is controlled by the HAN manager 210 and is connected to the destination network 240. The user terminals 330*c*, 330*d* are connected to the destination network 240 through the transport network 320*b*.

The destination network 240 itself may be connected to other networks 320*a*, 320*b* and user terminals 330*a*-330*d*. Here, the HAN manager connects user terminal 230*a* to the destination network 240 through the transport network 220*b*, but the ultimate destination of the network data 370 is the user terminal 330*a* connected to the destination network 240 through the transport network 320*a*.

Figure 4:
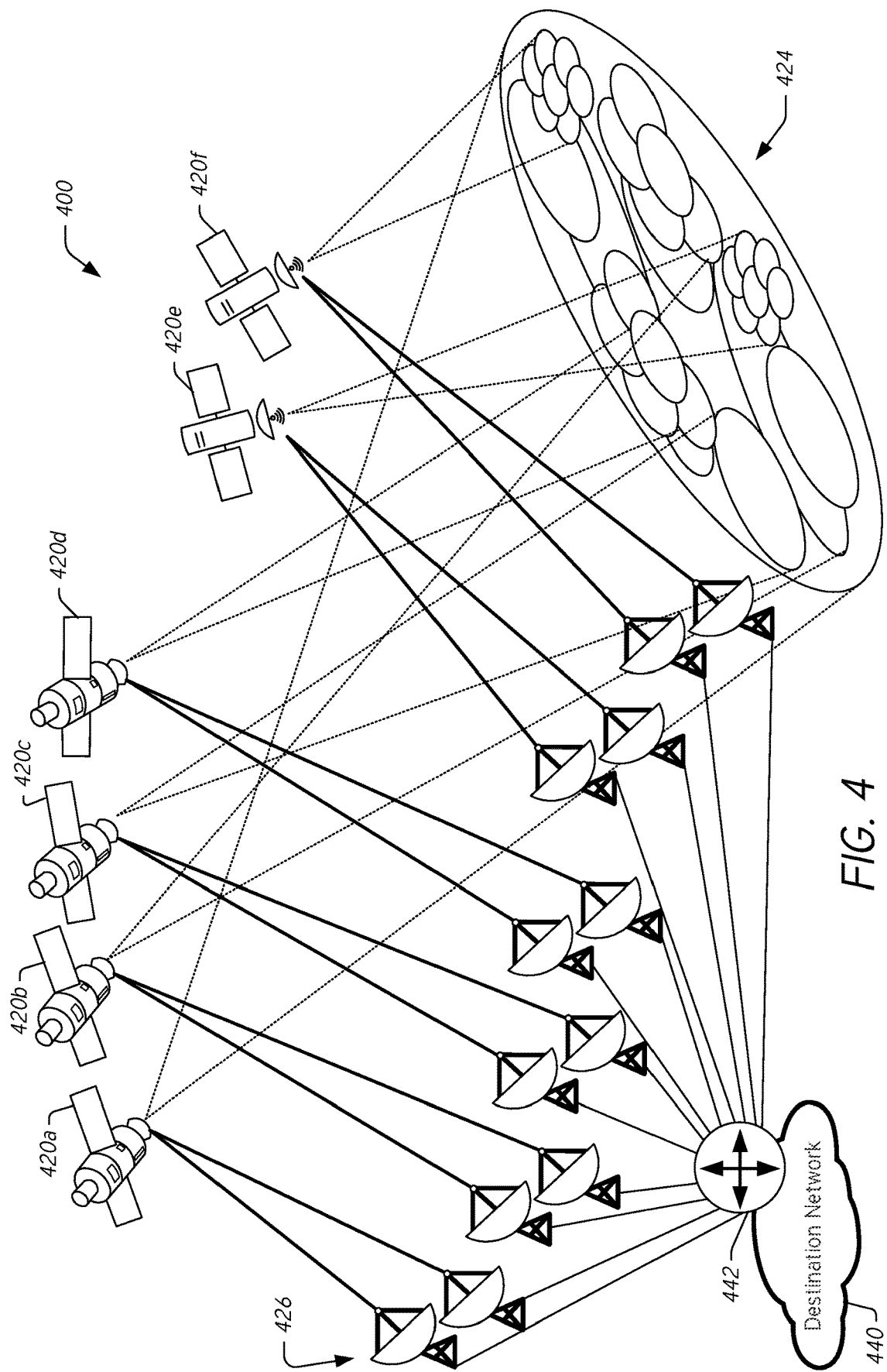
FIG. 4 illustrates another example HAN that includes a plurality of transport networks providing a corresponding plurality of spot beams covering multiple user terminals.

FIG. 4 illustrates another example HAN 400 that includes a plurality of transport networks 420*a*-420*f* providing a corresponding plurality of spot beams 424 covering multiple user terminals (not shown). The HAN 400 also includes satellite gateways 426 that connect a destination network 440 to respective transport networks 420*a*-420*f* through a network selector 442. The transport networks 420*a*-420*f* are similar to the communications networks 120*a*-120*d* and the transport networks 220*a*-220*d* described herein with reference to FIGS. 1 and 2A. The transport networks 420*a*-420*f* are illustrated as individual satellites, but it is to be understood that each transport network 420*a*-420*f* may include one or more satellites and one or more terrestrial components to form the transport network. The transport networks 420*a*-420*f* can utilize differing network communication protocols and/or waveforms and may use different frequency ranges. The network selector 442 is similar to the network selector described herein in that it enables the destination network 440 to connect to the plurality of different transport networks 420*a*-420*f* even though the transport networks utilize different frequency ranges, network protocols and/or waveforms.

Although not shown for the sake of clarity, it is to be understood that the HAN 400 includes a HAN manager similar to the HAN managers described herein with reference to FIGS. 1, 2A, 2B, 3, 5, and 6A-6F. The HAN manager of the HAN 400 is configured to control the transport networks 420*a*-420*f*, the user terminals, and the destination network 440. The HAN manager handles the bidding processes disclosed herein, as well as determines preferred or winning transport networks and/or determines a fulfillment list for individual user terminals. This may occur with or without an accompanying user request, as described herein. The HAN manager also establishes connections between individual user terminals, winning transport networks, and the destination network 440.

The spot beams 424 provided by the various transport networks 420*a*-420*f* overlap and cover multiple user terminals. Accordingly, individual user terminals may be covered by a plurality of spot beams. This allows an individual user terminal to connect to a preferred transport network using the systems, devices, and methods disclosed herein. For example, a user terminal can send a request to the HAN manager (not shown) to connect to the destination network 440. The HAN manager can determine which transport networks cover the user terminal, and from those available transport networks can solicit bids. Based on an analysis of the received bids, the HAN manager can then connect the user terminal to the destination network through the winning transport network. This allows a user terminal to switch between available transport networks to improve network performance and/or to avoid network failures or performance degradations. Similarly, a mobile user terminal may move between spot beams 424 and the HAN manager can provide a winning transport network (or an updated fulfillment list) when the user terminal enters the spot beam(s) of one or more new transport networks and/or leaves the spot beam(s) of one or more transport networks.

By way of example, and without limitation, the transport network 420*a* can be a geosynchronous (GEO) Ku-band network, the transport network 420*b* can be an advanced extremely high frequency (AEHF) network, the transport network 420*c* can be a WGS/Skynet network, the transport network 420*d* can be a GEO Ka-band network, the transport network 420*e* can be a medium earth orbit (MEO) Ka-band network, and the transport network 420*f* can be low earth orbit (LEO) Ku/Ka-band. Thus, the spot beams 424 can be provided by a combination of government networks, commercial networks, GEO satellite(s), MEO satellite(s), LEO satellite(s), terrestrial networks, and/or terrestrial wireless networks.

Example HAN Manager

Figure 5:
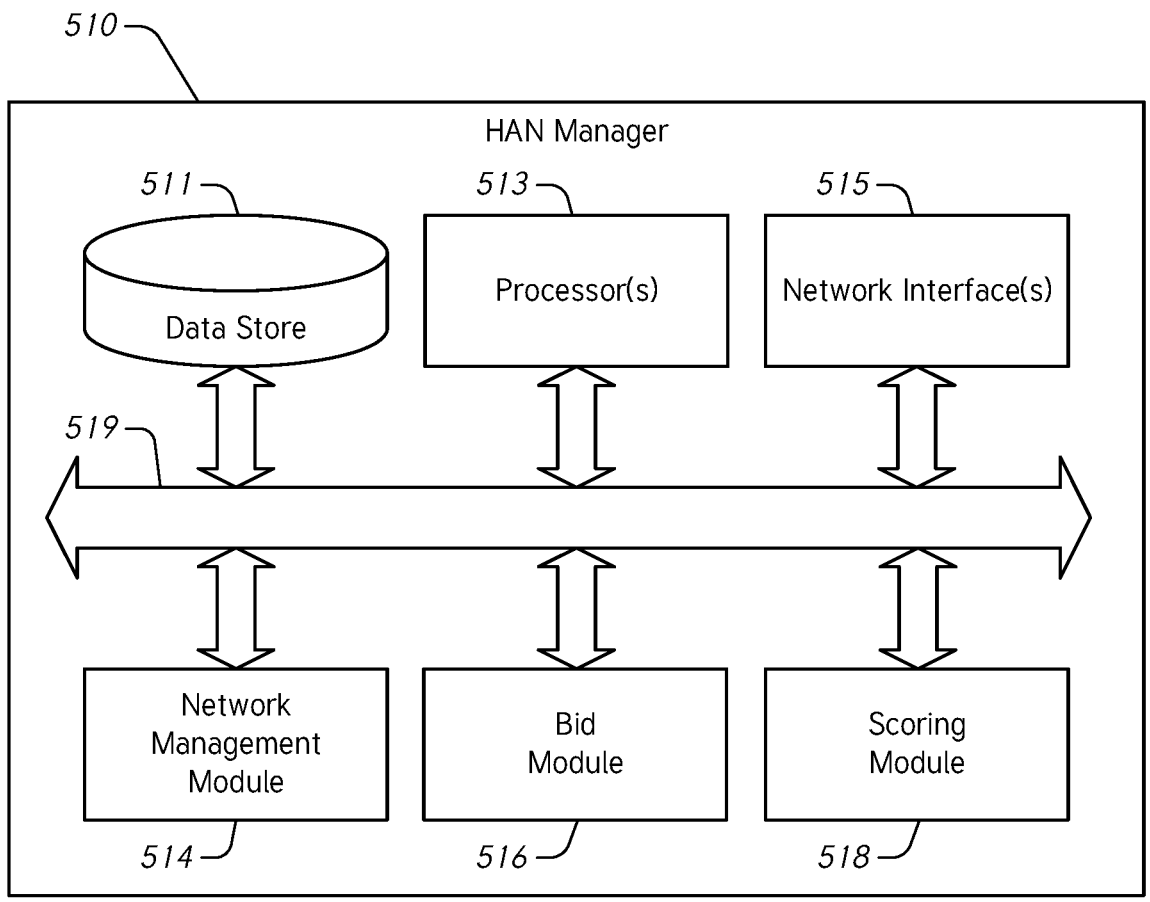
FIG. 5 illustrates a block diagram of an example HAN manager.

FIG. 5 illustrates a block diagram of an example HAN manager 510. The HAN manager 510 is configured to manage network connections between user terminals, communications networks, and destination networks using a bidding and scoring system. The HAN manager 510 is similar to the HAN managers 110, 210, 410, 610 described herein with reference to FIGS. 1, 2A, 2B, 3, 4, and 6A-6F and can be implemented in the HAN systems there described. The HAN manager 510 can employ any method described herein for managing connections to transport networks, such as the example methods 700 and 800 described herein with reference to FIGS. 7 and 8, respectively.

The HAN manager 510 can include hardware, software, and/or firmware components for managing network connections, communicating with user terminals and communications networks, monitoring communications network status, and scoring communications network bids. The HAN manager 510 is configured to receive requests from user terminals to connect through a communications network, to request bids from communications networks based on the received request, to receive the requested bids, to analyze and score the received bids, to send to the requesting user terminal a winning communications network or a fulfillment list of communications networks, and to establish a connection between user terminals and winning communications networks. The HAN manager 510 is also configured to monitor network status and to update winning transport networks or fulfillment lists in response to changes in communications networks, new user requests, and/or external factors that may affect network performance. The HAN manager 510 includes a data store 511, one or more processors 513, one or more network interfaces 515, a network management module 514, a bid module 516, and a scoring module 518. Components of the HAN manager 510 can communicate with one another, with external systems, and with other components of a network using communication bus 519. The HAN manager 510 can be implemented using one or more computing devices. For example, the HAN manager 510 can be implemented using a single computing device, multiple computing devices, a distributed computing environment, or it can be located in a virtual device residing in a public or private computing cloud. In a distributed computing environment, one or more computing devices can be configured to provide the modules 514, 516, 518 to provide the described functionality.

The HAN manager 510 includes the network management module 514. The network management module 514 is configured to manage and to establish network connections between user terminals and component networks. The network management module 514 is configured to send control commands to user terminals and communications networks to aid in establishing connections between these components. These commands may be sent to the communications networks and/or user terminals using the open standard network interface, described herein with reference to FIG. 1, associated with the network interface 515.

The network management module 514 is also configured to receive network status information from associated component networks. In some embodiments, the network management module 514 can monitor the status information and determine whether to initiate re-analysis of service bids to update a winning communications network and/or update a fulfillment list for one or more user terminals. In response to a determination that an update is warranted, the network management module 514 communicates with the scoring module 518 to update the analysis of the service bids. In certain embodiments, the network management module 514 forwards relevant status information to the scoring module 518 to allow the scoring module 518 to intermittently, periodically, or continuously update scores for communications networks. In such embodiments, a triggering event or condition need not occur for the scoring module 518 to update the scores of communications networks. Thus, the network management module 514, in conjunction with the scoring module 518, can prioritize available networks to provide fallback options to user terminals in cases of network degradation or failure. This can be done intermittently or continuously to push updates about available communications networks (e.g., winning networks or a fulfillment list) to user terminals.

The HAN manager 510 includes the bid module 516. The bid module 516 is configured to receive connection requests from user terminals. The user requests include user criteria, requirements, and/or preferences related to network connections to available communications networks. The bid module 516 formulates requests for service bids from available communications networks based on individual connection requests received from the user terminals. The bid module 516 also receives the service bids from the communications networks. The bid module 516 organizes and stores the bid information in the data store 511 to allow the network management module 514 and the scoring module 518 to access the bid information. In some embodiments, the bid module 516 is configured to determine which of the available communications networks is compatible with the connection or user request. In certain implementations, the connection request includes information about network compatibility. In various implementations, the HAN manager 510 is configured to determine which communications networks are compatible with the connection request.

The HAN manager 510 includes the scoring module 518. The scoring module 518 analyzes network information and knowledge of potential threats or outages to communications networks to determine a score for individual communications networks. The scoring module 518 uses one or more algorithms that determines a score for a communications network. The score can be based at least in part on user criteria contained in a connection request from a user terminal and network service information contained in a service bid from a communications network. In some embodiments, the scoring module 518 can determine a score based at least in part on network status information. The information in the service request, information in service bids, and the network status can be combined using weighting factors to determine a score. The scoring module 518 may also account for the capabilities (and in-network techniques) of a communications network to respond to and mitigate an attack. For example, if a user requirement includes resiliency of a communications network in the presence of a jammer, the scoring module 518 can be configured to evaluate the unique characteristics of individual communications networks to determine which networks have attributes that are suitable for maintaining connectivity if a jammer were to attempt to disrupt the communications network.

In some embodiments, the score can be continuously or intermittently updated and the results of the updates can be sent to the user terminals. In certain embodiments, updates to the scores can be triggered by certain events or conditions. For example, updates to the scores can be triggered by receiving a new service request or an update to user criteria from a user terminal. As another example, updates to the scores can be triggered by external conditions such as threats to a communications network and/or weather information. As another example, updates to the scores can be triggered by changes in network performance (e.g., caused by network congestion). As another example, updates to the scores can be triggered by a change in position of the user terminal and/or communications network. As another example, updates to the scores can be triggered due to a time limit being reached. The time limit can be set by the user terminal, the communications network, or the HAN manager 510.

The scoring module 518 allows for connections established in the associated HAN to be constantly updated. The scoring module 518 can be configured to update scoring in real-time. In this way, the HAN manager 510 can consistently and promptly push recommendations to user terminals to ensure satisfactory or improved network performance for a user. The scoring module 518 enables the HAN manager 510 to analyze threats to a communications network that may be present, potential ill effects caused by weather information, network congestion, and the like, thereby taking a larger look at the health of the communications networks to predictively or preemptively take action to prevent or reduce network degradation or failures for users. The scoring module 518 provides quantitative information that is based on connection requirements of a user, communications network performance, communications network capabilities, and/or communications networks service bids to enable real-time adaptation based on changing conditions. These changing conditions can include, for example, changes in geography (e.g., a user is flying in an airplane), data requirements (e.g., high data throughput requirements vs. low data throughput requirements), threats to networks (e.g., denial of service attacks, network congestion, adverse weather, etc.), or the like. These quantitative assessments can be used to change communications networks before outages occur. In some embodiments, the scoring module 518 provides predictive models that can be configured to foresee congestion, to see if other communications networks are congested, and to move a user terminal to a new communications network before the user experience is adversely affected.

The HAN manager 510 includes the network interface(s) 515 that is configured to connect to any compatible communications network. The network interface 515 is configured to allow the HAN manager 510 to be agnostic to communications networks, thereby allowing it to connect to any user terminal that can communicate with the compatible communications networks. The open standard network interface described herein with reference to FIG. 1 may be part of the network interface 515. As described herein, the open standard network interface is configured to receive network status information from communications networks and to send control commands to communications networks and user terminals. The status information can be sent to the network management module 514 for further processing and analysis, as described herein. Similarly, the network management module 514 can send control commands to user terminals and communications networks through the network interface 515 and the associated open standard network interface, if included.

The HAN manager 510 includes one or more processors 513 that are configured to control operation of the modules 514, 516, 518 and the data store 511. The one or more processors 513 implement and utilize the software modules, hardware components, and/or firmware elements configured to manage connections to transport networks through a bidding process. The one or more processors 513 can include any suitable computer processors, application-specific integrated circuits (ASICs), field programmable gate array (FPGAs), or other suitable microprocessors. The one or more processors 513 can include other computing components configured to interface with the various modules and data stores of the HAN manager 510.

The HAN manager 510 includes the data store 511 configured to store configuration data, user requirements, network statuses, network characteristics and capabilities, control commands, databases, algorithms, executable instructions (e.g., instructions for the one or more processors 513), and the like. The data store 511 can be any suitable data storage device or combination of devices that include, for example and without limitation, random access memory, read-only memory, solid-state disks, hard drives, flash drives, bubble memory, and the like.

The HAN manager 510 can be implemented in a variety of contexts. For example, the HAN manager 510 can be implemented to provide network connectivity for transportation (e.g., commercial flights, trains, buses, ships, etc.), to provide wireless network connectivity to customers at an establishment (e.g., a gas station, coffee shop, stadium, etc.), and the like. As another example, the HAN manager 510 can be employed to provide network connectivity to organizations with user terminals distributed in remote environments and/or where the user terminals are mobile. This may occur in a military context with a forward operating base or in a civilian context for a news network that desires to have network access at a remote news location. The HAN manager 510 enables the analysis and ranking of multiple communications networks to determine which communications network best serves a user terminal.

Example HAN Management Procedures

Figure 6A:
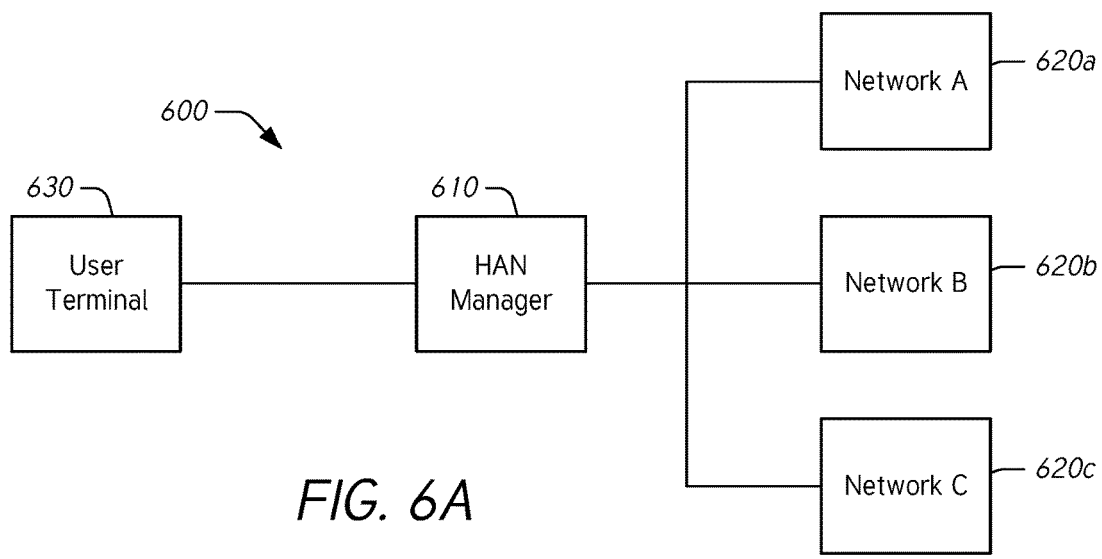
FIGS. 6A, 6B, 6C, 6D, 6E, and 6F illustrate a block diagram of an example HAN system that demonstrates how a HAN manager establishes a network connection between a user terminal and a winning communications network based on a bidding procedure.

FIGS. 6A-6F illustrate a block diagram of an example HAN system 600 that demonstrates how a HAN manager 610 establishes a network connection between a user terminal 630 and a winning communications network based on a bidding procedure. FIG. 6A illustrates the HAN 600 that includes the HAN manager 610 that is similar to the HAN managers described herein with reference to FIGS. 1-5. The HAN 600 also includes a user terminal 630 that is similar to the user terminals described herein with reference to FIGS. 1-3. The HAN 600 also includes communications networks 620a-620c that are similar to the networks described herein with reference to FIGS. 1-4.

Figure 6B:
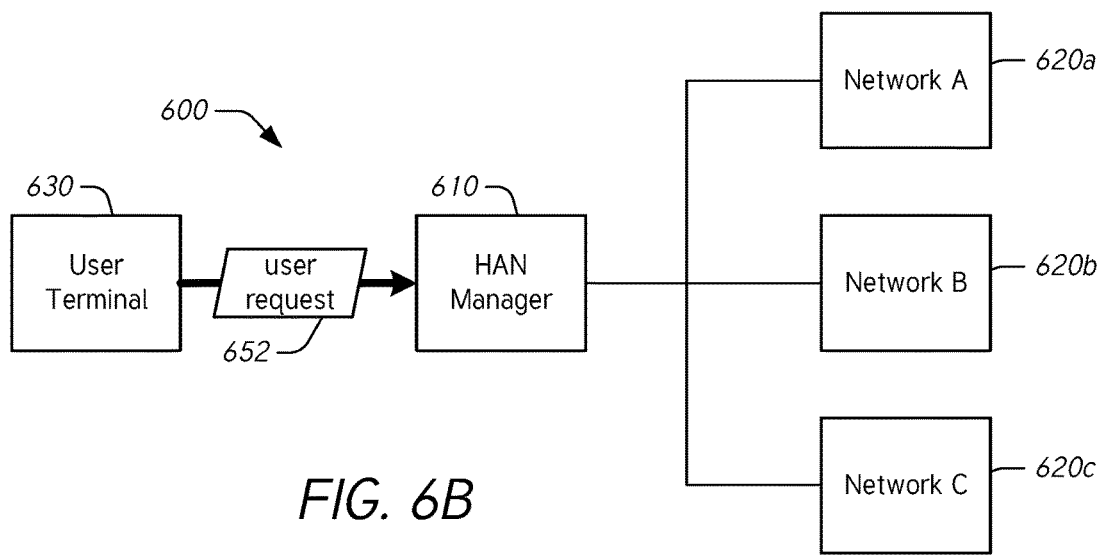

FIG. 6B illustrates the user terminal 630 sending a user request 652 for service to the HAN manager 610. The user request 652 can include a variety of requirements and preferences. For example, the user request 652 can include a data rate (e.g., forward link (FL), return link (RL)), interference environment (e.g., benign or contested), user terminal position (e.g., latitude and longitude), user terminal type (e.g., fixed or mobile), mobile terminal type (land, maritime, air, or space), terminal RF parameters (EIRP, G/T, etc.), terminal network compatibility. The following is an example user request: data rate (10 Mbps FL, 2 Mbps RL), interference (contested), terminal position (33.13 N, 117.28 W), terminal type (mobile), mobile terminal type (air), terminal parameters (55 dBW, 14.2 dB/K), network compatibility (Network A, Network B).

Figure 6C:
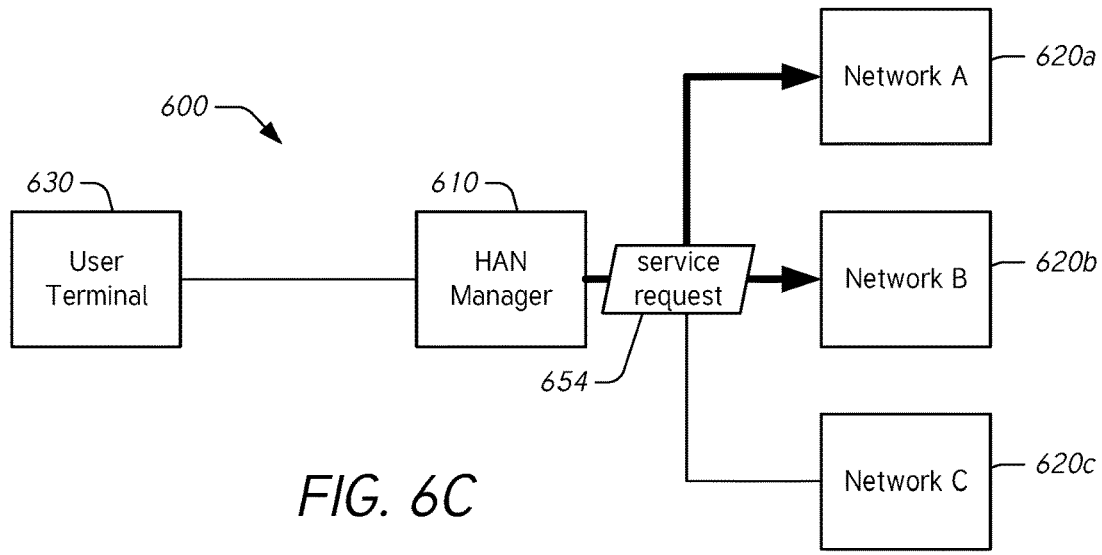

FIG. 6C illustrates the HAN manager 610 announcing a service request 654 to the communications networks 620a-620c. In certain embodiments, the service request 652 can include parameters to be specified in the service bid and/or the format of the service bid. The HAN manager 610 formulates the service request 654 based on the user request 652.

In some embodiments, the service request 654 can be sent to the compatible networks specified in the user request 652. In the example of FIG. 6C, the user request 652 may indicate that the user terminal 630 is incompatible with Network C 620c and, consequently, the HAN manager 610 does not send the service request 654 to Network C 620c.

In some embodiments, the HAN manager 610 does not announce a service request 654 to incompatible networks. Rather, upon receiving the user request 652, the HAN manager 610 first determines which of the available communications networks are compatible with the service request 654 and then announces the service request 654 only to the compatible networks. In the example of FIG. 6C, the HAN manager 610 may determine that Network C 620c is not compatible with the service request 654 and, consequently, does not announce the service request 654 to Network C 620c.

In certain embodiments, the HAN manager 610 announces the service request 654 to all available communications networks 620a-620c. In such embodiments, incompatible communications networks either do not respond to the service request 654 or provide a response that the HAN manager 610 determines does not meet the criteria of the service request 654.

Figure 6D:
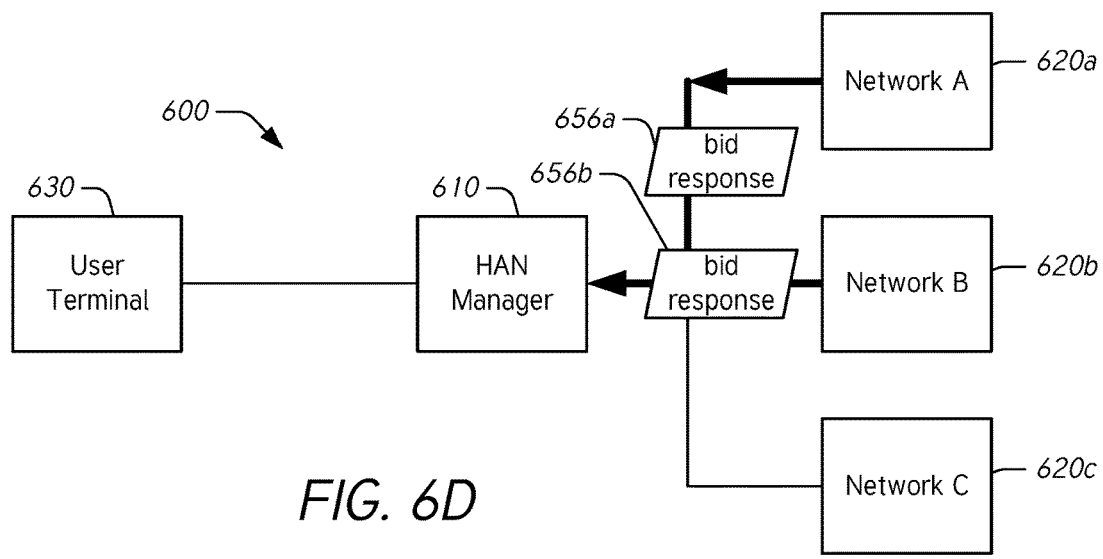

FIG. 6D illustrates the HAN manager 610 receiving the bid responses 656a, 656b from the compatible communications networks 620a, 620b. By way of example, the format of the bid can include a data rate (e.g., FL, RL), an interference environment (e.g., benign or contested), a service delivery probability (0-100%), and/or a price ($/bit, $/minute, $/bps, etc.). The following is an example bid response 656a from Network A 620a: data rate (8 Mbps FL, 2 Mbps RL), interference (contested), service delivery probability (95%), and price ($10/Mbit). The following is an example bid response 656b from Network B 620b: data rate (12 Mbps FL, 4 Mbps RL), interference (contested), service delivery probability (98%), and price ($50/Mbit). In this example, Network C is not compatible and therefore is not eligible to bid.

Figure 6E:
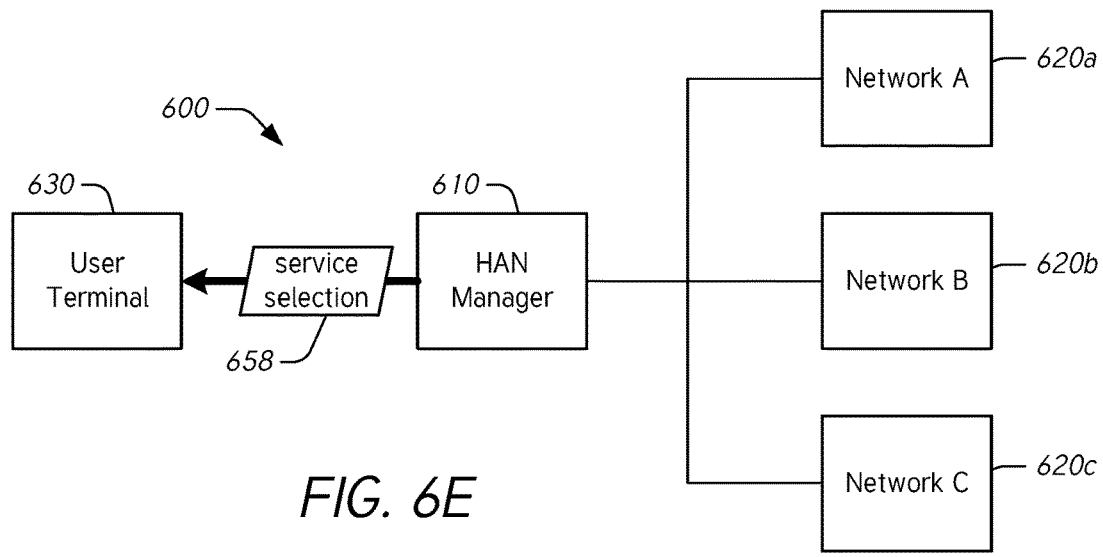

FIG. 6E illustrates the HAN manager 610 sending a service selection 658 to the user terminal 630. The service selection 658 can be the communications network with the highest score based on an analysis of the bid responses 656a, 656b. The service selection 658 can be a fulfillment list of communications networks ordered by score based on an analysis of the bid responses 656a, 656b. Analysis of the bid responses can include assigning a score or ranking value to the bid responses 656a, 656b. The process for assigning a score or rank can include variable weighting of the parameters of the bid responses 656a, 656b.

In some embodiments, the scoring criteria can include an assessment of interference performance (e.g., a numeric value between 1-10) that is based on a stand-off distance (km) and frequency agility (MHz). The scoring criteria can also include an assessment of waveform performance (e.g., a numeric value between 1-10) that is based on a spreading factor (e.g., a numeric value) and a hopping speed (e.g., a time delay). The scoring criterial can also include a cyber security score (e.g., a numeric value between 1-10) and can also include a score for previous bid compliance (e.g., a numeric value between 1-10).

Figure 6F:
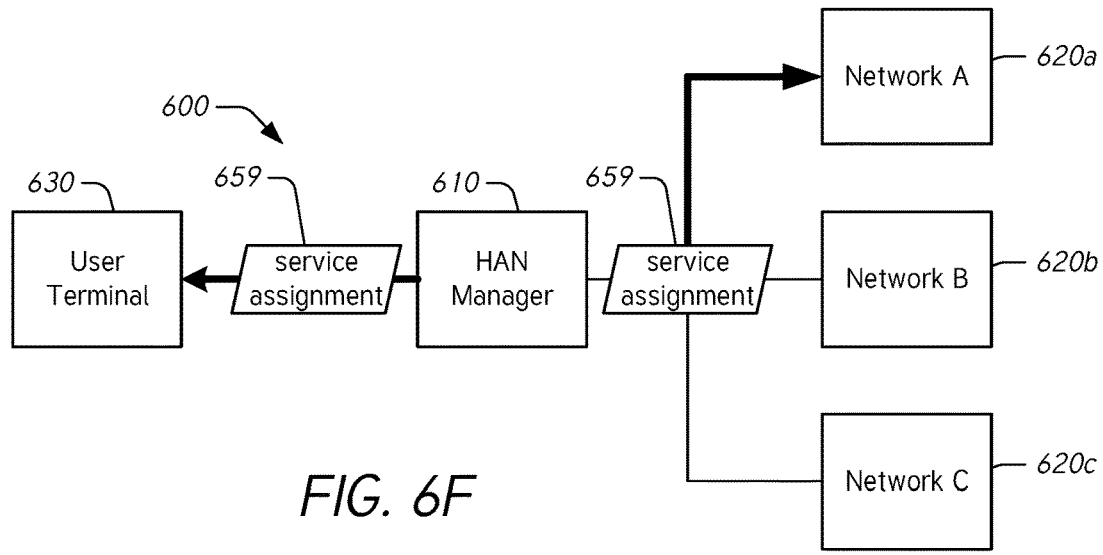

FIG. 6F illustrates the HAN manager 610 sending a service assignment 659 to the winning communications network 620a. The HAN manager 610 can send the service assignment 659 to the user terminal 630 as well. In some embodiments, the service assignment 659 includes credentials to enable connectivity between the user terminal 630, the communications network 620a, and a destination network (not shown).

Figure 7:
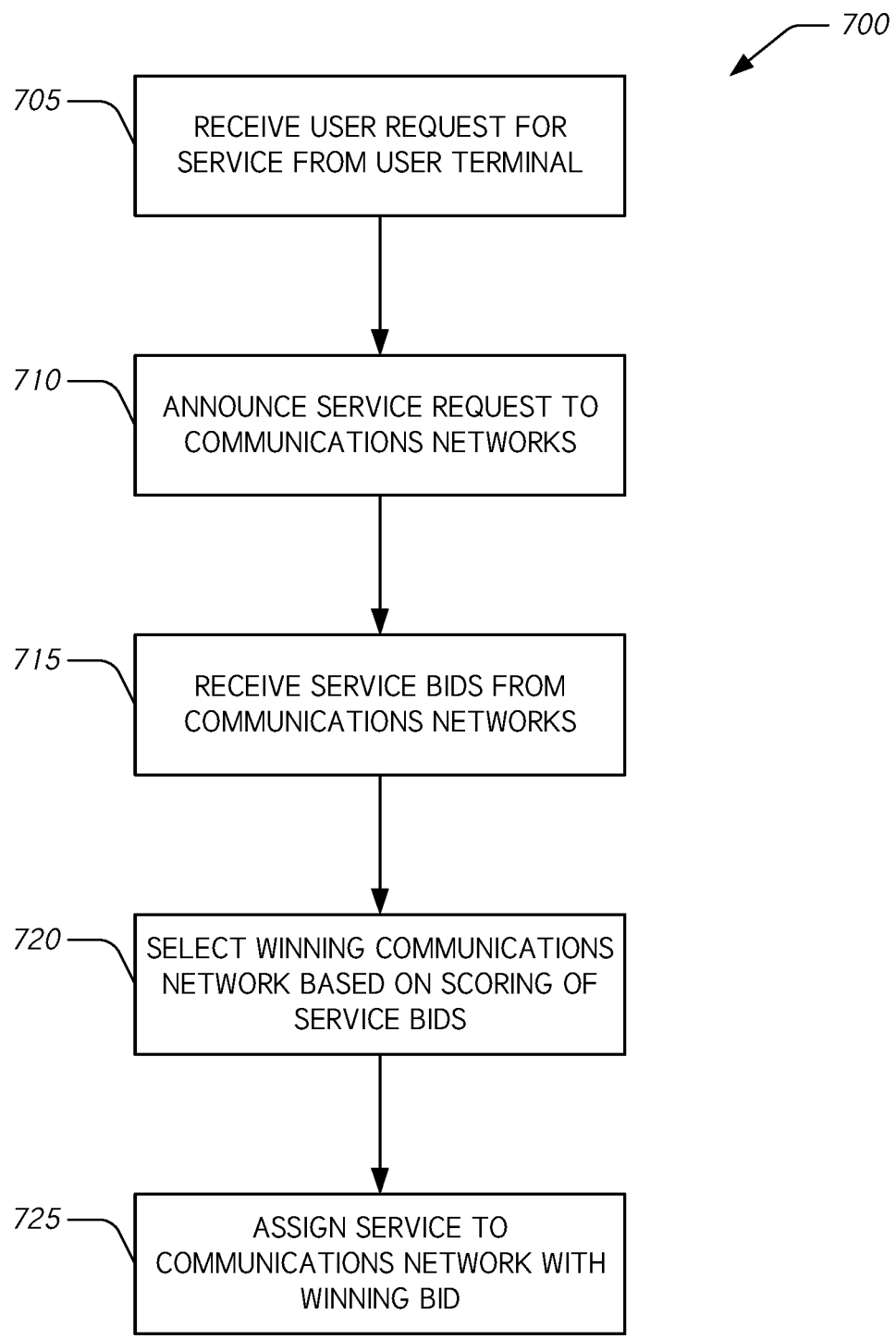
FIG. 7 illustrates a flow chart of an example method of selecting a winning communications network based on a user request.

FIG. 7 illustrates a flow chart of an example method 700 of selecting a winning communications network based on a user request. The method 700 can be performed by any of the HAN managers described herein with reference to FIGS. 1-6F. For ease of description, the method 700 will be described as being performed by a HAN manager. This is not to be understood to limit the scope of the disclosure. Rather, any step or portion of the method 700 can be performed by any component or combination of components of the systems described herein.

In block 705, the HAN manager receives a user request for service from a user terminal. This is similar to what is described with reference to FIG. 6B. In some embodiments, the user request can include a destination network, such as the destination networks described herein with reference to FIGS. 2A-4. A user request can be sent any time a user terminal wishes to connect to a communications network and/or any time performance requirements of the user terminal changes. In some embodiments, the method 700 restarts each time a user request is received from a user terminal.

In block 710, the HAN manager announces a service request formulated from the user request to communications networks in the hybrid adaptive network. This is similar to what is described with reference to FIG. 6C. The available communications networks can change dynamically. In some implementations, the method 700 may return to block 710 in response to changes in network availability. In some embodiments, the HAN manager does not send the service request to incompatible networks. In such embodiments, an incompatible communications network may be identified in the user request and/or the HAN manager may determine which communications networks are incompatible with the service request.

In block 715, the HAN manager receives service bids from compatible communications networks. This is similar to what is described with reference to FIG. 6D. In some embodiments, service bids can be sent to the HAN manager without the HAN manager requesting the bids in response to changes in the corresponding communications network. For example, where performance or price changes, the HAN manager can request an updated service bid or the affected communications network can send an updated service bid without first receiving a request from the HAN manager. Where an updated service bid is received, the method 700 may be re-initiated starting at block 715.

In block 720, the HAN manager selects a winning communications network based on the determined scores of the service bids. In some embodiments, the HAN manager constructs a fulfillment list comprising an ordered list of compatible communications network based on the determine scores of the service bids. Scoring the received service bids can include determining a weighted score of the parameters included in the service bids. This is similar to what is described with reference to FIG. 6E. The service selection (e.g., a winning communications network and/or a fulfillment list) can be sent to the requesting user terminal.

In some embodiments, the HAN manager repeats the method 700 starting at block 720 when there are changes to network performance of one or more of the compatible communications networks. In certain implementations, the HAN manager monitors the status of the communications networks to determine when there are changes to network performance or other relevant network parameters. Accordingly, responsive to such changes, the HAN manager recalculates scores or ranks for each compatible communications network. If there is a change in score, in the winning communications network, and/or the order of the fulfillment list, the HAN manager can send an updated service selection to the affected or relevant user terminal.

In block 725, the HAN manager assigns service to the communications network with the winning bid. This is similar to what is described with reference to FIG. 6F. The HAN manager can be configured to notify the user terminal of the winning network as well as the winning network. A network connection can be established through a translation agent, as described herein, allowing users to utilize the same interface to connect and to communicate with each compatible communications networks.

The method 700 represents a bidding process that may be used to establish an initial connection with a communications network and that may also be repeated based on changing conditions or criteria, as described herein. For example, the method 700 can be repeated, starting at any suitable step of the method, when some triggering event or condition occurs. Examples of triggering events include, but are not limited to, changes in the state of communications networks, changes in state of a user terminal, changes in state of threats to communications networks (e.g., natural threats such as weather, unnatural threats such as equipment failures, intentional threats such as denial of service attacks, etc.). In some embodiments, a user terminal is configured to update the HAN manager with the link performance of the communications network to which it is connected. If link performance changes, an update to the service selection may be triggered (e.g., the method 700 restarts at a suitable step in the method). This may be desirable where, for example, a service level agreement (SLA) exists with the user and it is beneficial to maintain at least a minimum level of service to fulfill the SLA, which may benefit from switching communications networks.

Another triggering event may be the expiration of a bid. In some embodiments, a service bid can have a duration. As long as the service bid is still valid, the user terminal can use the communications network. The service bid can have a duration of, for example and without limitation, hours, days, weeks, months, etc. After the bid expires, the method 700 may be repeated by starting at a suitable step such as block 710 to request new service bids or block 720 to determine a new score for bids that are still valid.

Other triggering events may include a user terminal requesting re-bidding, the HAN manager determining that the winning communications network is no longer compliant with the user request, the HAN manager determining that network characteristics have changed, or the like.

Figure 8:
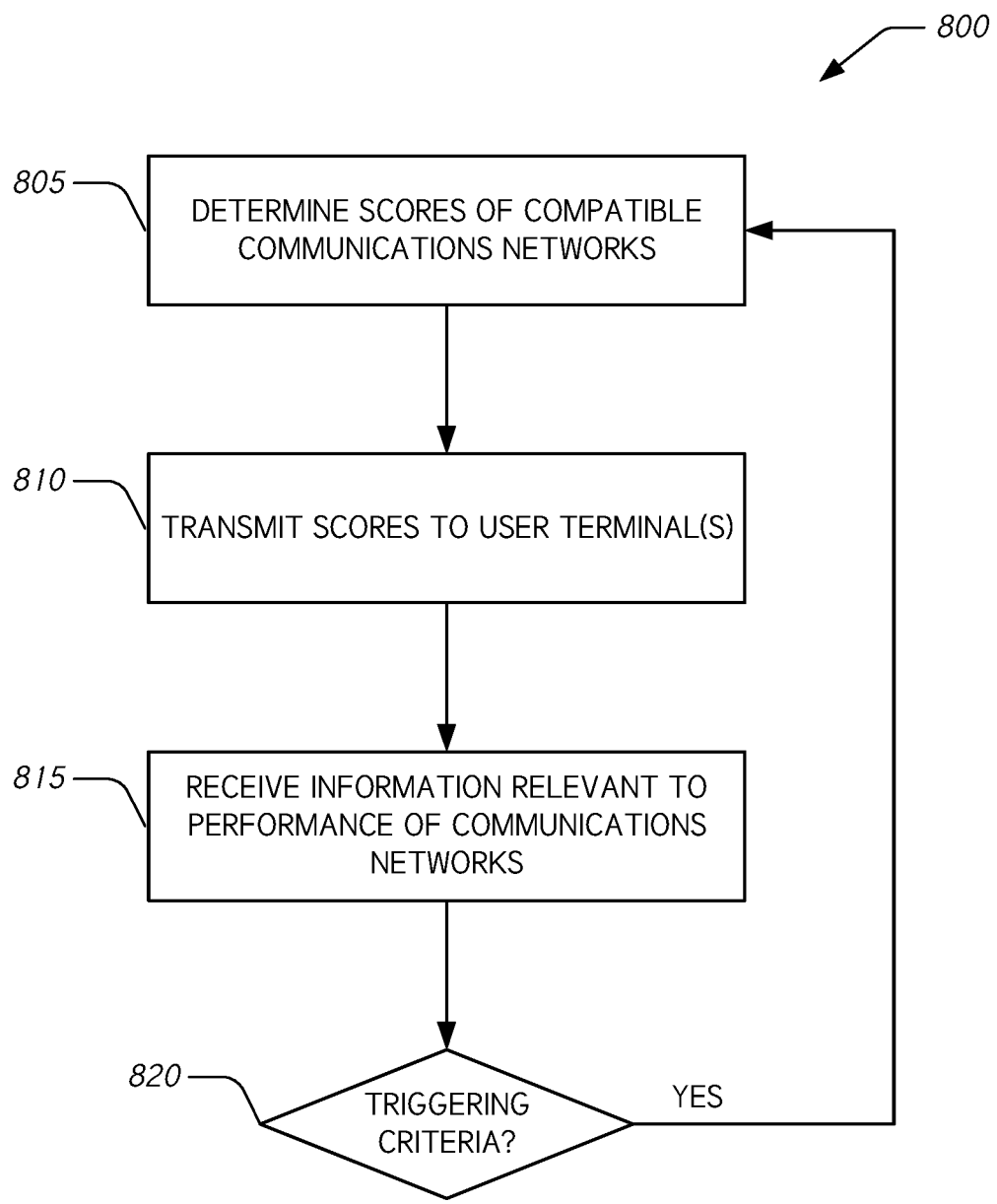
FIG. 8 illustrates a flow chart of an example method 800 of updating rankings of communications networks in real-time.

FIG. 8 illustrates a flow chart of an example method 800 of updating rankings of communications networks in real-time. The method 800 can be performed by any of the HAN managers described herein with reference to FIGS. 1-6F. For ease of description, the method 800 will be described as being performed by a HAN manager. This is not to be understood to limit the scope of the disclosure. Rather, any step or portion of the method 800 can be performed by any component or combination of components of the systems described herein.

In block 805, the HAN manager determines scores of compatible communications networks. The scores or rankings can be determined based on user criteria, user requirements, service bids, network performance, or the like as described herein.

In block 810, the HAN manager transmits scores to relevant user terminals. Relevant user terminals can include user terminals that are compatible with communications networks whose scores or rankings have changed. This can allow a user terminal to change communications networks where a preferable communications network exists. The HAN manager transmits or pushes the updated scores or rankings to the user terminal without the user terminal necessarily requesting the updated information. This is advantageous because it allows the user terminal to connect to a superior communications network without first requesting an update to the scoring or ranking of communications networks.

In block 815, the HAN manager receives information relevant to performance of communications networks. This information includes parameters directly associated with network performance as provided by the communications networks themselves (e.g., the information included in the service bids). This information also includes data associated with external factors that may affect network performance such as weather, intelligence related to threats to the network, and the like. The information that can be received by the HAN manager in this block can adapt over time and may include any suitable factor that affects network performance.

In block 820, the HAN manager determines whether triggering criteria occurs and, in response to determining that the triggering criteria occurs, returning to block 805 to update analysis of the communications networks. Triggering criteria includes any of the criteria described herein including, for example and without limitation, changes in network performance, changes in user requirements, external threats to the network, superior options becoming available, and the like.

The method 800 can be used as a predictive model. For example, the method 800 can be used to foresee network congestion and to see if other networks are congested. In response, the HAN manager can move a user terminal before user experience is adversely affected.

In addition, the method 800 allows the scoring or ranking of communications networks to be constantly updated. These updates can be triggered in real-time. This may result in the HAN manager constantly or consistently pushing recommendations to user terminals. The method 800 allows the HAN manager to receive and to react to threats that may be present. Threats may arise in response to analysis of, for example, weather information, network congestion, intelligence on potential attacks to networks, or the like. The method 800 allows the HAN manager to analyze network performance as a whole, including external factors that may not be considered by other similar systems. Although the method 800 may be triggered by an updated request from a user terminal, it is not required or it may be unnecessary due at least in part to the HAN manager consistently updating scores and rankings of communications networks.

Terminology and Additional Embodiments

Described herein are systems, devices, and methods that manage connections to transport or communications networks based on a bidding and scoring process. As used herein, the terms transport networks, communications networks, and component networks are used interchangeably. These terms include, but are not limited to, communications networks that provide network connectivity between a user terminal and a destination network, as described herein. These networks can include satellite networks, terrestrial networks, terrestrial wireless networks, or any combination of these.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general-purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A hybrid adaptive network (HAN) manager configured to manage network connections between user terminals and communications networks, the HAN manager comprising:
   a network interface configured to receive network communication from the user terminals and the communications networks;
   a data store comprising computer executable instructions; and
   one or more processors configured to execute the computer executable instructions stored on the data store, the computer executable instructions configured to cause the HAN manager to:
   receive a user request from a user terminal, the user request including connection criteria;
   determining a set of compatible communications networks from the plurality of communications networks, the set of compatible communications networks including communications networks that are compatible with the connection criteria of the user request;
   send to the set of compatible communications networks a service request based on the user request;
   receive, in response to the service request, a bid response from individual compatible communications networks of the set of compatible communications networks;
   determine a score for the individual compatible communications networks, the score based at least in part on parameters included in the received bid response;
   send a service selection to the user terminal, the service selection including an ordered list of at least a portion of the compatible communications networks, the order of the ordered list based on the scores determined for the individual compatible communications networks; and responsive to a triggering event affecting availability of at least one compatible communications network, the triggering event including a threat to at least one of the compatible communications networks:
update the ordered list determined at the HAN manager to generate an updated ordered list; and
send a second service selection to the user terminal, the second service selection including the updated ordered list.

2. The HAN manager of claim 1 wherein the network interface further includes an open standard network interface that is configured to send control commands to the communications networks.

3. The HAN manager of claim 1 wherein the network interface further includes an open standard network interface that is configured to receive network status information from the communications networks.

4. The HAN manager of claim 1 wherein the communications networks include two or more communications networks that operate over different frequency ranges.

5. The HAN manager of claim 1 wherein the communications networks include two or more communications networks that operate using different network protocols.

6. The HAN manager of claim 1 wherein the communications networks include two or more communications networks that operate using different waveforms.

7. The HAN manager of claim 1 wherein the user request includes a minimum data rate.

8. The HAN manager of claim 1 wherein the score depends at least in part on previous bid compliance.

9. The HAN manager of claim 1 wherein the bid responses each include a service delivery probability.

10. A hybrid adaptive network comprising the HAN manager of claim 1 and one or more of the communications networks.

11. A hybrid adaptive network comprising the HAN manager of claim 1 and one or more of the user terminals.

12. The HAN manager of claim 1, wherein the triggering event includes a change in network performance of at least one of the compatible communications networks.

13. The HAN manager of claim 1, wherein the updated ordered list reorders the portion of the compatible communications networks that remain on the updated ordered list relative to the ordered list, the order of the updated ordered list based on updated scores determined for the individual compatible communications networks.

* * * * *